SELF-TAPPING THREADED FASTENERS

Filed Feb. 8, 1965 5 Sheets-Sheet 1

INVENTOR.
HARVEY F. PHIPARD, JR.

BY
BUCKHORN, BLORE, KLARQUIST & SPARKMAN
ATTORNEYS

INVENTOR.
HARVEY F. PHIPARD, JR.
BY
BUCKHORN, BLORE, KLARQUIST & SPARKMAN
ATTORNEYS

SELF-TAPPING THREADED FASTENERS

Filed Feb. 8, 1965 5 Sheets-Sheet 3

INVENTOR.
HARVEY F. PHIPARD, JR.

BY BUCKHORN, BLORE,
KLARQUIST & SPARKMAN
ATTORNEYS

April 19, 1966 H. F. PHIPARD, JR 3,246,556

SELF-TAPPING THREADED FASTENERS

Filed Feb. 8, 1965 5 Sheets-Sheet 4

INVENTOR.
HARVEY F. PHIPARD, JR.

BY

BUCKHORN, BLORE, KLARQUIST & SPARKMAN
ATTORNEYS

INVENTOR
HARVEY F. PHIPARD, JR.

BY
BUCKHORN, BLORE, KLARQUIST & SPARKMAN
ATTORNEYS

United States Patent Office 3,246,556

Patented Apr. 19, 1966

3,246,556
SELF-TAPPING THREADED FASTENERS

Harvey F. Phipard, Jr., South Dartmouth, Mass., assignor to Research Engineering & Manufacturing, Inc., New Bedford, Mass., a corporation of Massachusetts Filed Feb. 8, 1965, Ser. No. 430,832
2 Claims. (Cl. 85—46)

This application is a continuation-in-part of my parent application, Serial No. 187,883, filed April 16, 1962, now abandoned, which was a continuation-in-part of application, Serial No. 22,490, filed April 14, 1960, and also now abandoned. This application also relates to subject matter disclosed for the first time in my copending application, Serial No. 351,469, filed March 12, 1964, which is a division of my above parent application. Reference is also made to my Patent 3,195,156, dated July 20, 1965, relating to lobular thread-forming devices.

The present invention relates to improvements in self-tapping threaded fasteners and more particularly, to self-tapping fastener devices having shank and work-entering end portions of different pitch-surface cross-sectional configurations.

The self-tapping screws with which this application is concerned are of the type which form internal threads by a swaging action. While conventional screws of this type have the advantage of forming no chips as compared with self-tapping screws which form internal threads by a cutting action, the former screws also have certain well-recognized limitations. These limitations include a high driving torque, which frequently makes the differential between the driving torque and the stripping torque of such screws so small as to cause difficulty in driving them into a fully seated position in an assembly without exceeding their stripping torques and thus stripping their threads. This difficulty occurs most frequently when screws are driven using clutch controlled power drivers commonly used in assembly lines, since the clutches of power drivers cannot be relied upon to disengage each time exactly at the preset torque release value. Naturally, such screw failures result in costly production delays.

Self-tapping screws of the swaging type have been previously proposed in which the differential between driving torque and stripping torque is substantially increased, principally by providing such screws with threaded portions of arcuate polygonal cross-sectional shape throughout the full length thereof. Although effecting a substantial reduction in driving torque, certain varieties of screws of such shape have the disadvantage of a stripping torque less than that desired in certain applications. With the present invention, the above-mentioned disadvantage is overcome by providing a cross-sectional pitch surface configuration on the thread of the shank portion of the screw that is different than the cross-sectional configuration of the threaded portion provided on the work-entering end portion.

The general objective of the present invention is to provide a new and improved self-tapping screw having a high differential between driving and stripping torque, and more specifically maximum stripping torque while the driving torque is reduced to a minimum, this being accomplished by means of a screw having a work-entering end portion of different pitch-surface cross-sectional configuration than that of the thread on the shank portion, to the effect that a greater percentage of thread engagement is obtained on the shank portion than on the work-entering end portion.

It is a primary object of the present invention, therefore, to accomplish the above objective by providing a new and improved self-tapping screw having a thread-forming portion with a pitch surface of arcuate triangular cross-sectional shape and a holding portion having a pitch surface of circular cross-sectional shape, thus combining the low driving torque characteristic of the triangular cross-sectional screws with the high stripping torque characteristic of the more conventional, round self-tapping screws.

Another specific object of the present invention is to provide a new and improved self-tapping screw having a driving means at one end, and a threaded shank including a round holding portion, a lobular intermediate shank portion, and a tapered lobular work-entering portion, the intermediate shank and tapered work-entering portions being of similar arcuate triangular cross-sectional shape.

Specifically, in accordance with the present invention, the shank of a self-tapping screw is provided with a threaded main shank or holding section having circular minor, pitch and major cross-sections and a tapered, non-circular or lobular, work-entering section provided with lobes arranged in continuation of the thread on the holding section. The radial extent of the lobes increases toward the holding section to a maximum which, when the screw is rotated, defines a circle approximating that defined by the major diameter of the thread formation in the holding section.

In the accompanying drawings, there are shown illustrative embodiments of a self-tapping screw in accordance with the invention from which these and other of its objectives, novel features and advantages will be readily apparent.

In this application, the following definitions shall be applicable;

"Pitch diameter" is used as a generic term to designate the diameter, that is, maximum width of any section of either the "pitch cylinder" or the "pitch cone."

"Pitch cylinder" is, on a straight thread, an imaginary coaxial cylinder, round or otherwise, the surface of which would pass through the thread profiles, or the projection thereof, at such points as to make the width of the groove, or the projection thereof, equal to one-half the basic pitch.

"Pitch cone" on a taper thread is an imaginary coaxial cone, the surface of which would pass through the thread profiles, or the projection thereof, at such points as to make the width of the groove, or the projection thereof, equal to one-half the basic pitch. See, for example, the section of a pitch cone indicated in dotted lines 36 in FIG. 7.

"Pitch surface cross section" is used herein to designate the transverse cross section of any pitch surface, such as that of either the pitch cylinder or the pitch cone as hereinbefore defined.

It will be observed that the pitch surface and pitch cone of the lobular portions of the screws herein described are not a round cylinder and not a cone of round cross section. The divergence in the case of the cylinder arises from the lobular or arcuate triangular cross section of the threaded intermediate shank portion and in the case of the cone it arises from the lobular or arcuate triangular cross section of the threaded work-entering portion.

Figure 1:
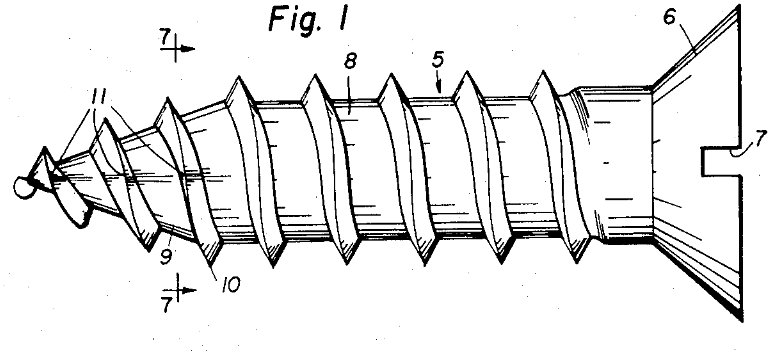
FIG. 1 is a side elevation of a two-section, self-tapping screw in accordance with the invention.
Figures 2, 3, 4:
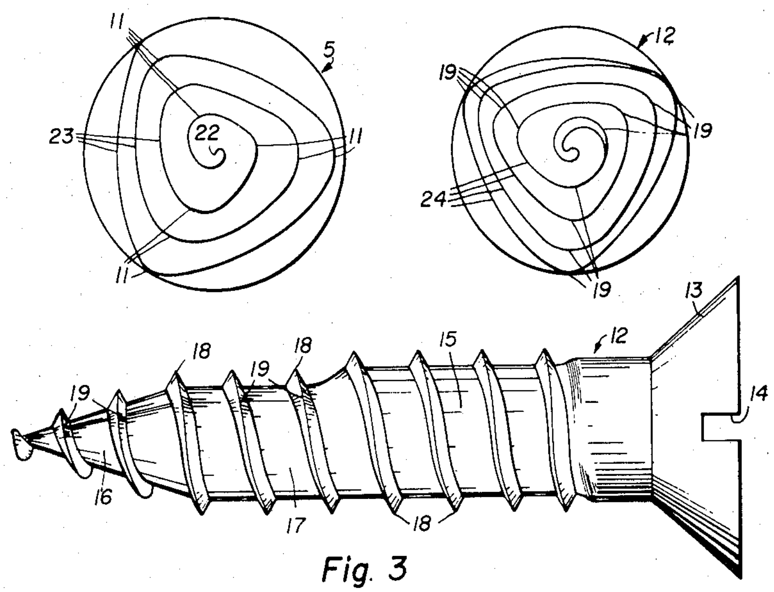
FIG. 2 is an end view of the work-entering end of the screw shown in FIG. 1.
FIG. 3 is a side elevation of a three-section, self-tapping screw in accordance with a further modification of the invention.
FIG. 4 is an end view of the work-entering end of the screw of FIG. 3.

The self-tapping screw generally indicated at 5 of FIGS. 1 and 2 is shown as having a head 6 provided with a tool-receiving recess 7 which may be of any type. The shank 5 of the screw consists of a first, main shank or holding section 8 of circular cross section and a tapered, lobular work-entering or thread-forming section 9 whose cross-sectional shape is shown as being approximately that of an arcuate, equilateral triangle. Both sections are provided with a continuous helical thread 10. While the screw illustrated is of the gimlet point type, the invention is also applicable to other conventional types of screws. The main shank, as illustrated, has a straight thread formation having constant major, pitch and minor diameters, and the pitch surface thereof is of circular cross section. It is to be understood that this is not a limitation in that, for example, the round shank may have a slight up-taper toward the head, if desired. The work-entering or thread-forming portion 9 has a tapered thread formation having major, pitch and minor diameters progressively decreasing toward the work-entering end.

It will be noted that, because of the generally arcuate triangular cross-sectional shape of the tapered work-entering section 9, the thread 10 establishes a series of arcuate lobes 11 whose radial extent or distance from the screw axis 22 increases progressively toward the shank section 8 until the thread crest of the last such lobe defines, as the screw is rotated, a circle whose diameter is approximately that of the outside or major diameter of the thread 10 in the main shank section 8.

As previously mentioned, each lobe 11 is shown as being arcuate and has at its outer extremity a thread sufficiently developed with respect to its position relative to the work-entering end of the screw to carry out its thread-forming function, whereas the arcuate sides 23 between lobes need not have a similarly developed thread because such sides do not perform any thread-forming function. It is important that the sides 23 merge smoothly and gradually with the lobes 11 in order that the lobes may carry out their swaging function without cutting chips from the walls of the pilot hole with which they are in frictional contact. The arcuate lobes 11 have a pitch radius of curvature substantially less than one-half the pitch diameter that is, maximum width of the corresponding cross section, and also less than one-half the distance from the screw axis 22 to the lobe extremity to reduce the frictional contact between the lobes and the walls of the pilot hole to a minimum. The arcuate sides 23, on the other hand, have a pitch radius of curvature greater than one-half of the pitch diameter in the corresponding cross section.

It will be understood that a screw of arcuate triangular cross section throughout the main shank as well as in the work-entering end thereof will not have a high stripping strength in thin metals as compared with that of one having a round main shank. Full thread engagement with the female thread in the parent body is limited, in the case of an arcuate triangular shank, to the lobes only, with only limited overlapping of threads or thread engagement occurring along the arcuate sides between such lobes. However, with a round shank, maximum thread engagement is effected through 360 degrees. Thus the screw of FIG. 1 represents the optimum in a self-tapping screw in that the main shank is shaped like a conventional screw to provide maximum holding power and the work-entering end is shaped to provide a minimum driving torque.

In FIGS. 3 and 4, is shown a further modification of a self-tapping screw 12 also of the gimlet point type, provided with a head 13 having a tool-receiving recess 14. The screw has a straight main shank or holding section 15 of circular cross-sectional shape, a tapered work-entering or thread-forming section 16 of arcuate equilateral triangular cross-sectional shape, and a straight intermediate shank section 17 also of arcuate equilateral triangular cross-sectional shape. A thread formation 18 is arranged and disposed to provide a straight thread in the intermediate section 17 and the shank or holding section 15, and a tapered thread in the work-entering end 16. The thread formation in the main shank section 15 has circular cross sections while the cross-sectional shape of sections 16 and 17 is shown as being approximately of an arcuate, equilateral triangle establishing lobes 19 with intermediate broad sides 24.

The radial extent of the lobes 19 in the tapered thread-forming section 16 increases toward the intermediate shank section 17 until the radial extent of the lobe next adjacent such section is the same as that of the lobes in the section 17. The radial extent of the lobes in the section 17 is such that they define, when rotated, a circle whose diameter is approximately the same as that of the outside or major diameter of the thread 18 in the circular holding section 15. Each lobe 19, at least in the tapered section 16, has the function of swaging a portion of the thread in the workpiece and is arcuate with a pitch radius of curvature considerably less than one-half of the pitch diameter in the corresponding cross section, similar to the screw in FIG. 1.

The arcuate intermediate sides 24 of the screw of FIGS. 3 and 4 do not effect any frictional engagement with the walls of the pilot hole and since they are continued over an intermediate portion of the screw shank, the driving torque is reduced to an even greater degree than in screw of FIG. 1. Such a screw having a lobular intermediate section is especially useful where a driving torque even lower than that provided by the screw of FIG. 1 is desired and where the intermediate section 17 is not needed to develop holding power, as for example in very hard thin plates or in sheet metal where the intermediate section as well as the tapered point will be driven completely through the work.

Figure 6:
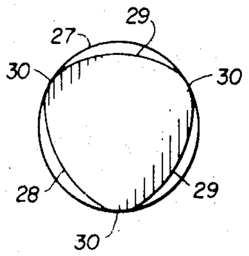
FIG. 6 is an end view of the blank of FIG. 5.
Figure 5:
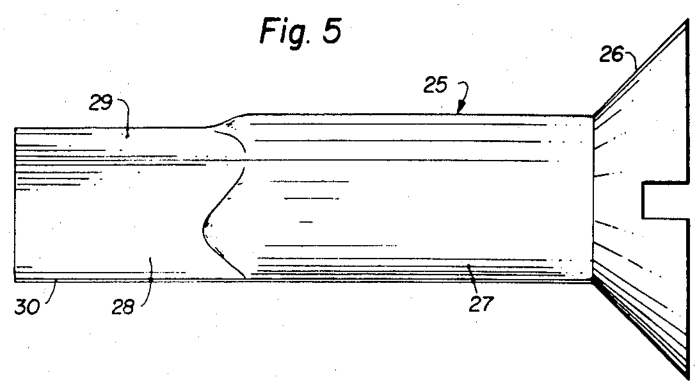
FIG. 5 is a side view of a blank from which the screw of FIG. 1 is made.

In FIGS. 5 and 6 is shown one form of a blank from which the screw of FIG. 1 may be made, which blank 25 is provided with an enlarged driving head 26 corresponding to the head 6 in FIG. 1, and a main shank 27 of circular, or round, cross section. A lobular portion 28 is provided at the end opposite the head 26. As shown especially in FIG. 6, the end portion 28 is of arcuate triangular cross section. The blank 25 may be formed by first severing a predetermined length of round wire or rod stock in a cold heading machine, and then upsetting the head portion 26 and also extruding a short opposite end section through a die orifice of arcuate triangular shape to form the section 28.

For manufacturing the screw shown in FIGS. 3 and 4, a blank will be prepared similar to that shown in FIGS. 5 and 6 except that the lobular end portion 28 will be given a length at least equal to the combined lengths of the end and intermediate portions 16 and 17 of the screw.

With reference to FIG. 6, it will be observed that the transverse width of the lobular portion of the blank is substantially constant through 360° around this blank portion even though it is not round. Threads may be rolled on such blanks although, due to the fact that the two portions are of different cross section, especially prepared thread-rolling dies must be provided. Different modifications of rolling dies will be described herein. With any of these forms of thread-rolling dies, it is possible to form threads on the lobular portion of the blank having lobular pitch surface cross sections while the thread portion on the round part of the blank will have circular pitch surface cross sections. This is important to the prevent invention as will appear from a consideration of the view of FIG. 7.

Figure 7:
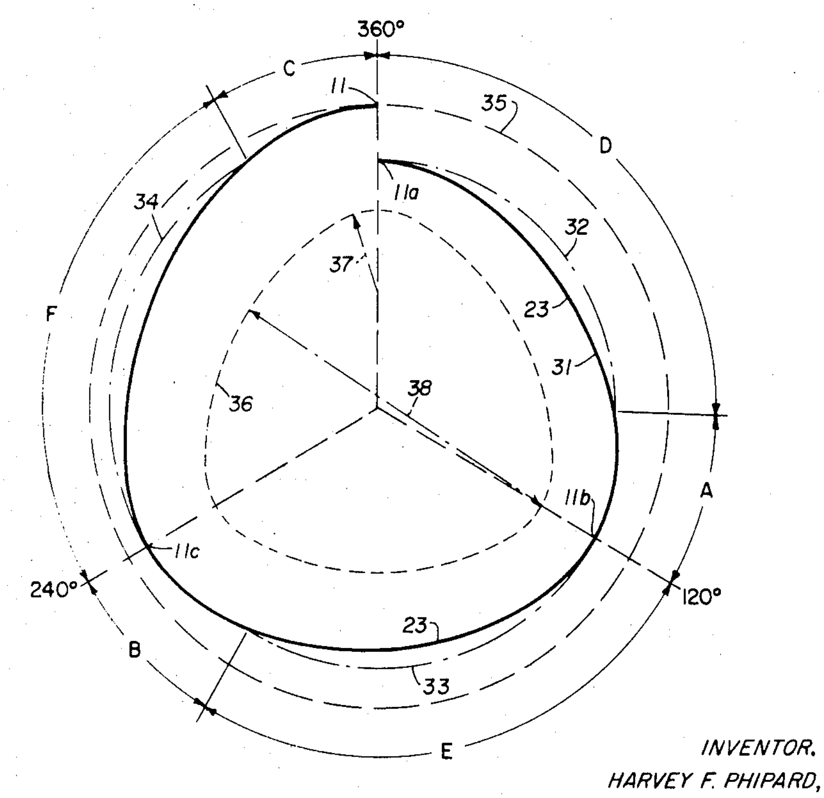
FIG. 7 is a diagram illustrating one convolution of a thread such as along the line 7—7 of FIG. 1.

In FIG. 7 the line 31 illustrates the peripheral or crest contour of a single sprial revolution of thread on the tapered end for example, of the screw 5 next adjacent the round portion 8. The root of the thread portions which will be formed in a parent body by the crests of the lobes 11*a*, 11*b* and 11*c*, may be represented by the circular arcs 32, 33 and 34, the extent of which may be further represented by the arcs D, E and F. From the crests of the lobes the screw thread recedes from contacting engagement with the surfaces of the thread formed in the parent body and hence there is no frictional contact throughout the entire extent of the arcs D, E and F. The working engagement of the lobes 11*b*, 11*c* and 11, with the body of parent material is indicated by the arcs A, B and C, respectively. It will be observed that the total engagement amounts to approximately 25% of the total peripheral extent of the screw thread. Due to the fact that approximately three-fourths of the screw thread is thus held out of engagement with the metal of the parent body, the frictional drag is held to a minimum and the driving torque of the screw is also thus reduced to low value. For this reason, the screw as illustrated may readily be driven through relatively thick metal members with a very low driving torque requirement. At the same time the angle of inclination of the thread portions over the distances A, B and C, is not so steep that they will cut chips from the body being threaded.

The dotted circle 35 indicates the root circumference of the thread formed by a complete revolution of the last lobe 11. Since it is assumed that the line 31 represents the last lobular thread before it merges into the circular thread on the round shank portion of the screw, the circle 35 also may therefore respresent the crest circumference of the thread on such shank portion.

Since the portions 23 of the thread between the lobes 11 do not engage the metal during the thread-forming operation, these portions 23 need not be perfectly formed during the thread-rolling procedure. In fact, with some types of screws even the lobes toward the tip of the work-entering end need not have fully formed crests. It is important, however, that the lobes of any pitch surface cross section have a pitch radius of curature substantially less than one-half the diameter of such cross section.

Referring to FIG. 7, the dotted line 36 represents a typical pitch surface cross section, of the tapered work-entering end 9 of the screw 5. This pitch surface cross section is of uniform width throughout 360 degrees. In other words, the maximum transverse dimension 38 is constant throughout 360 degrees, and attention is directed to the fact that this maximum dimension, or width, is not always measured through the central axis of the member. The radius of curvature of the lobes of such cross section indicated at 37 is substantially less than one-half, and more nearly one-fourth the width 38 of such cross section. With the lobes of the threads thus formed the swaging of the female thread over the lobular distances A, B and C will take place smoothly with a minimum of driving effort and without formation of any chips.

Figures 8, 9:
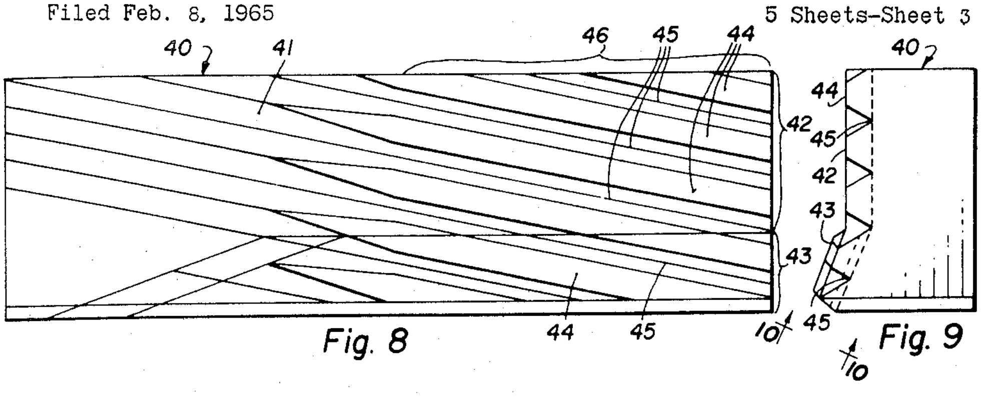
FIG. 8 is a top plan view of a face of one of a pair of dies used for making the screw shown in FIG. 1.
FIG. 9 is a right end view of the die of FIG. 8.
Figure 10:
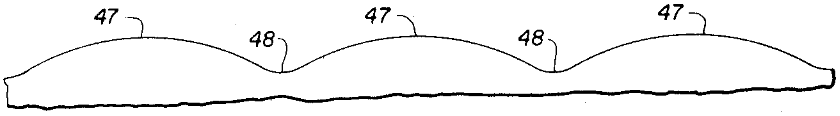
FIG. 10 is an enlarged profile of the surface of the die of FIG. 8 as viewed in the direction of the arrows 10—10 of FIG. 9.

With reference to FIGS. 8, 9 and 10, a die 40 is shown having a modified die face 41 especially adapted for rolling the blank 25 of FIG. 5. It is to be understood that a pair of similar cooperating dies are required, but only one will be described. As shown most clearly in FIG. 9, the die face 41 in cross section has a first, generally flat rolling section 42 for rolling the circular portion 27 of the blank 25 and a second rolling section 43 laterally adjacent and inclined to the first section for rolling threads on the lobular work-entering portion 28 of such blank. These sections are shown incorporated in a so-called flat thread-rolling die although it is to be understood that the same general scheme could be incorporated in rotary or planetary thread-rolling dies. Each of the two rolling sections 42 and 43 is provided with a series of generally parallel, angularly extending ridges 44 and valleys 45 of a form complementary to that of the root and crest respectively of the screw thread being rolled, at least in the finishing section 46 of the die face as shown in FIG. 8.

However, as shown in FIG. 10, the inclined rolling section 43 of the die face in the longitudinal direction is scalloped or undulating to provide a series of bumps 47 and depressions 48 which form the arcuate sides and lobes respectively of the thread in the lobular portion of the screw. This enables both the round and lobular portions of the blank to be threaded simultaneously by permitting the blank axis in the round portion to remain at a substantially constant distance from the flat die face 42 while the same axis in the lobular blank portion can undulate relative to the adjacent scalloped die face 43. In other words, as a screw blank is rolled the length of the die face shown in FIGS. 8 and 10, the path of the screw axis will be defined by the flat, first thread-rolling section 42 and the second thread-rolling section will undulate with respect to such path. A screw produced by the die 40 may have any number of sides and intermediate lobes in the work-entering portion thereof, by providing a corresponding number of bumps and depressions in the portion 43 for each revolution of the blank. However, in screws of small size a three-lobed screw is preferable as more lobes will cause the screw point to approximate too closely a circular configuration. While it may be preferred to use a blank having a preformed lobular end portion 28, this is obviously not necessary, especially in the case of a gimlet point screw where the end is heavily worked and the excess material pinched off. Accordingly the screw of FIG. 1 may be made by use of the same dies as illustrated in FIGS. 8, 9 and 10 but by insertion of a blank of circular cross section throughout and in which case the end of the blank will be formed into the required tapered lobular cross section.

Figure 11:
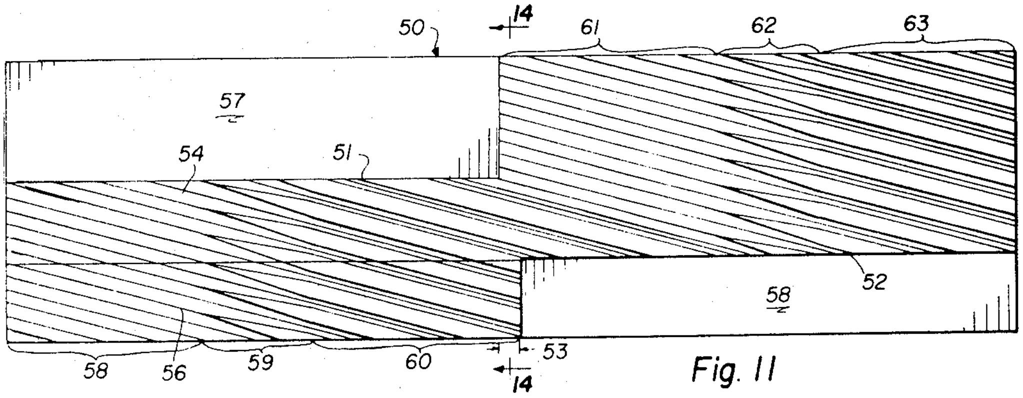
FIG. 11 is a top plan view of one of a pair of dies used for making the screw shown in FIG. 3.

With reference to FIG. 11, a flat die 50 is shown having another form of a die face which is, in this instance, designed especially for rolling threads upon a blank for the type of screw shown in FIG. 3 having an intermediate lobular shank portion in addition to a lobular work-entering end and a round shank portion. The die 50 is, of course, one of a pair and in this case is adapted to first roll threads on the lobular portions of the blank in the rolling section 51 of the die face and thereafter to roll threads on the circular portion of the blank in the section 52 of the die face, although both portions of the blank are threaded in one continuous stroke of the movable die. Interposed between the lobular and round rolling sections of the die is a short transfer section 53 to insure a smooth continuous die stroke at the point where threading of the lobular blank portion ends and threading of the circular blank portion begins. Both the lobular and round rolling sections of the die face are divided into three subsections, a first or starting subsection 58 and 61 where initial penetration of the blank by the die takes place, a second or transition section 59 and 62, and a finishing section 60 and 63 where the threads are rolled to their finished form.

Figure 12:
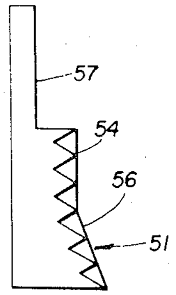
FIG. 12 is a left end view of the die of FIG. 11.

As shown more clearly in FIG. 12, the lobular rolling section 51 includes a flat section 54 for rolling threads on the straight lobular portion 17 of the screw and an inclined section 56 for rolling threads on the tapered lobular portion 16 of the screw. In addition, a relieved plane die surface 57 is provided adjacent the ridged die face 54 and has sufficient relief so that the round portion of the blank is out of contact therewith and is permitted to undulate as the lobular blank portion is threaded.

Figure 14:
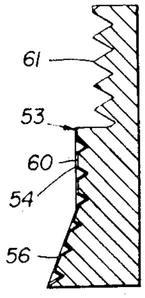
FIG. 14 is a sectional view of the die taken along the line 14—14 of FIG. 11.
Figure 13:
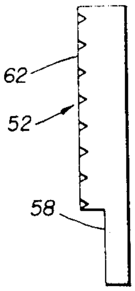
FIG. 13 is a right end view of the die of FIG. 11.

In FIG. 13 is shown an end view of the round blank portion rolling section 52 at its finished end, including the adjacent relieved plane surfaced portion 58 which provides clearance between the previously threaded lobular tapered section and the die as the round portion of the blank is threaded. It is to be understood that the portion 58, instead of being relieved as shown, may be provided with thread ridges the same as are provided on the section 52. FIG. 14 shows the transfer section 53 which includes the end of the finishing section 60 in the lobular rolling portion and the beginning of the starting section 61 of the round rolling portion 52 of the die face.

Figure 15:
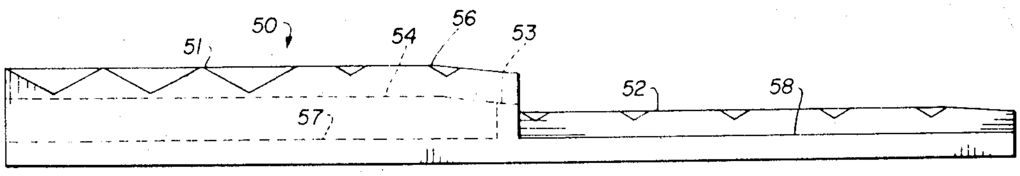
FIG. 15 is a side view of the die of FIG. 11.

As shown in FIG. 15, both the lobular and round rolling sections 51 and 52 of the die face are flat in profile in the longitudinal direction of the die, which makes such a pair of dies considerably less expensive to manufacture than the partially scalloped dies of FIG. 8. Also, although the dies of FIG. 8 thread the lobular and round blank portions simultaneously the speed at which parts can be threaded is not appreciably greater than with the flat die of FIG. 11.

Although the die illustrated in FIGS. 11 to 15 is especially prepared for forming a screw thread formation as shown in FIG. 3, having both a tapered work-entering portion 16 and a short, intermediate straight shank portion 17, both of lobular cross section, it will be appreciated that by changing the relative widths of the die surfaces 51 and 52 screws having lobular portions of any desired length relative to the circular shank portion can be formed using the same general type of die.

A limiting factor in the use of the flat dies of the type illustrated in FIG. 11 is that the cross-sectional shape of the lobular blank portions should be such that they may be rolled smoothly between a pair of relatively uniformly spaced apart die faces. Referring again to FIG. 6, the lobular blank portion is of arcuate equilateral triangular shape having arcuate sides 29 merging smoothly with the arcuate lobes 30. The arcuate lobes 30 have a radius of curvature less than one-half the diameter in the corresponding section. The transverse width, as measured with a micrometer, through any lobular cross section of the blank is approximately constant throughout 360 degrees so that such portion will roll smoothly between uniformly spaced-apart rolling die face portions.

Figure 17:
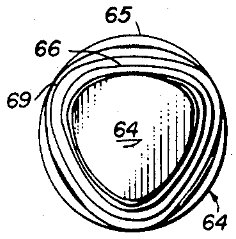
FIG. 17 is an end view of the screw shown in FIG. 16.
Figure 16:
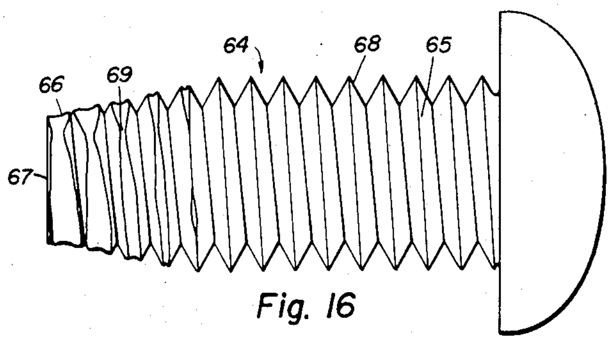
FIG. 16 is a side view showing another modification of a screw made in accordance with the present invention.

In FIGS. 16 and 17 is shown a machine screw 64 embodying the present invention having a round main shank 65 and a tapered lobular thread-forming portion 66 similar to the screw of FIG. 1 but terminating in a blunt end 67. The thread formations 68 has a constant pitch diameter in the main shank and also has a slightly less but constant maximum pitch surface width in the lobular work-entering portion. The major diameter in the work-entering portion decreases toward the work-entering end 67, however, and the thread crests 69 become increasingly unfinished toward such end.

Figure 19:
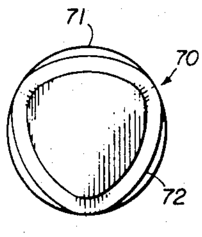
FIG. 19 is an end view of the blank shown in FIG. 18.
Figure 18:
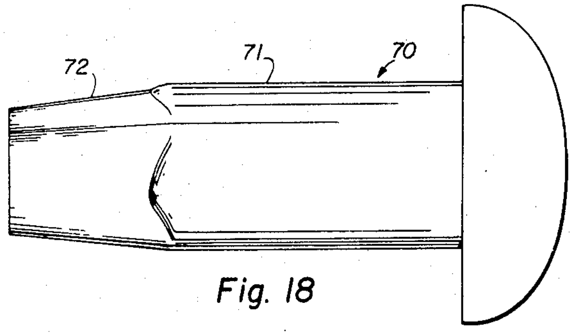
FIG. 18 is a side elevation of a blank used for the screw shown in FIG. 16.
Figure 23:
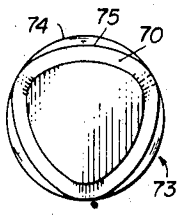
FIG. 23 is an end view of the blank of FIG. 22.

In FIGS. 18 and 19 is illustrated a blank 70 required for the screw of FIG. 16 and 17, having a round shank 71 and a tapered lobular end portion 72 which is illustrated more clearly by the end view of FIG. 19. FIGS. 22 and 23 are similar views illustrating a blank 73 for use in making the screw shown in FIGS. 20 and 21. This blank has a round shank portion 74, and a lobular intermediate portion 75 and a tapered lobular end portion 76.

Figure 21:
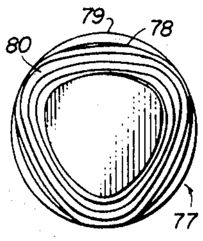
FIG. 21 is an end view of the screw shown in FIG. 20.
Figure 20:
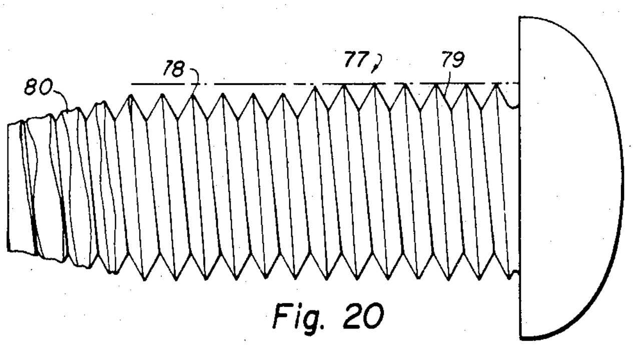
FIG. 20 is a side elevation of a screw according to a still further modification.
Figure 22:
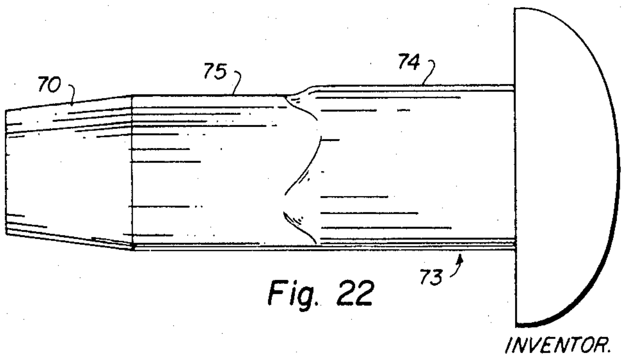
FIG. 22 is a side elevation of a blank for the screw of FIG. 20.
Figures 24, 25:
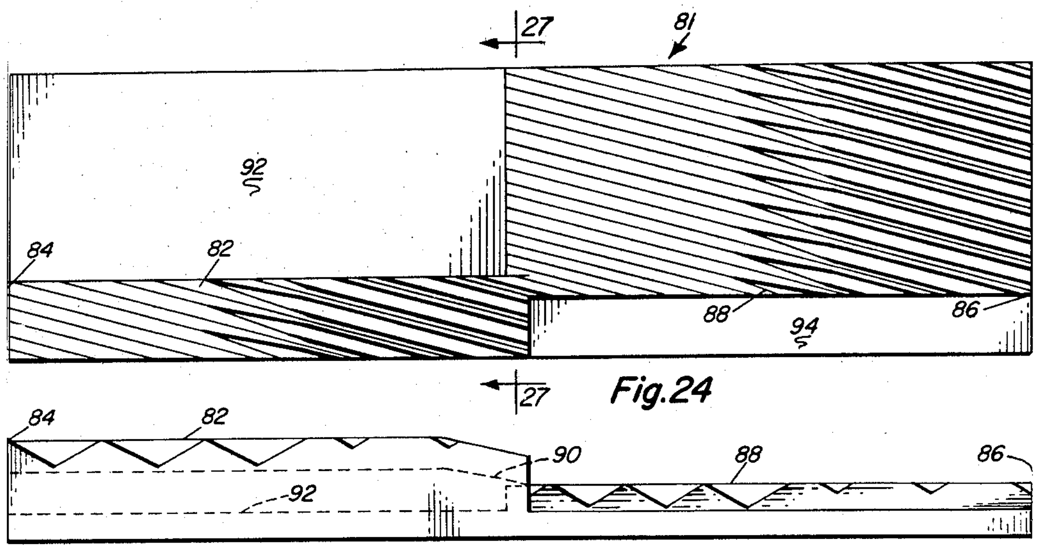
FIG. 24 is a top plan view of one of an alternative pair of dies suitable for making the screw of FIG. 1.
FIG. 25 is a side view of the die of FIG. 24.
Figure 26:
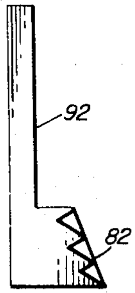
FIG. 26 is a left end view of the die of FIG. 24.
Figure 27:
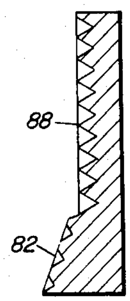
FIG. 27 is a sectional view of the die taken along the line 27—27 of FIG. 24.

In FIGS. 20 and 21 is shown a machine screw 77 similar to that of FIG. 16 but having a lobular intermediate shank portion 78 interposed between the round main shank 79 and the lobular thread-forming portion 80, so that such screw can be formed by thread-rolling dies somewhat similar to those described with reference to FIGS. 11 to 15. The die face portion 51 would be flat in the transverse direction, however, like the face portion 52, and the pair of dies could be mounted in the machine in a tapered or inclined relation in the longitudinal direction with respect to each other to provide for the closer spacing required for threading the lobular portions of the blank.

As previously explained with reference to FIG. 7, it is not necessary that the thread crests of the lobes be finished, that is, fully formed, especially at the tip of the work-entering end. This condition is clearly shown in the screws shown in FIGS. 16 and 20. However, as the thread aproaches the shank portion of the screw, the crests of the lobes become more fully formed. The lobular thread merges smoothly into the round thread on the main shank, that is, the radius of curvature of the lobes increases until it equals the radius of curvature of the round thread. The flattened arcuate sides between such lobes disappear gradually as the lobular thread blends into the circular shape.

A common feature of all of the illustrated screws is that the maximum width of the pitch surface of the thread formation in the lobular screw portion nearest the circular shank portion is just slightly less than the pitch diameter of the thread formation in the circular shank portion. Furthermore, the pitch surface cross sections of lobular configuration nearest the circular shank portion are internally tangential to the pitch surface cross sections of circular configuration. This latter feature provides a smooth and gradual transition between the lobular and round portions of the screws and thus prevents any abrupt increase in required driving torque as the round portion of the screw first enters the work.

Screws in accordance with the invention may be of any general type and thread formation. In any case, each such screw has a tapered work-entering section provided with a series of threaded arcuate lobes as described for accurately forming internal threads with the driving torque suitably minimized, while the thread or threads in the main circular shank section remote from the extremity are primarily holding threads and ensure maximum stripping strength. In comparing the embodiments illustrated in FIGS. 1, 3, 16, and 20, it will be observed that the taper of the work-entering end sections may be confined to the conical surface of lobular arcuate triangular cross-section defined by the crest of the lobular thread on such work entering end portions.

The above-described screw modifications and others as well having both circular and lobular threaded portions can be made using dies similar to the flat-faced dies illustrated in FIG. 11. For example, FIGS. 24–27 illustrate a modification 81 of the die of FIG. 11 suitable for rolling threads on the blank 25 of FIG. 5 to produce the gimlet point screw 5 of FIG. 1. The die 81 includes a relatively narrow, transversely inclined, ridged die surface section 82 extending from a starting end 84 of the die to the midsection thereof for rolling threads of arcuate polygonal pitch surface cross section on the lobular work-entering end portion 28 of the blank 25. From an opposite, finishing end 86 of the die 81, a second, relatively wide ridged die surface section 88 extends to the midsection of the die, for rolling threads of circular pitch surface cross section on the round shank portion 27 of the blank 25.

The ridged die sections 82 and 88 respectively overlap slightly in the longitudinal die direction, the overlapping portion of the die section 82 providing an inclined roll-off portion 90 for the lobular end of the blank 25, which gradually recedes to the level of the die surface 88 to provide during thread rolling a smooth transition of the blank from the section 82 to the section 88. The section 88 also overlaps the section 82 slightly in the transverse die direction, the purpose of which is to provide at the juncture of the round shank and lobular end portions of the blank 25 smooth continuity between the thread formation 11 rolled on such blank portions. The latter overlapping also provides a gradual transition in the shape of the pitch surface cross sections of the thread at such juncture from an arcuate triangular configuration to a circular configuration.

Flat, relieved surface portions 92 and 94 are provided transversely adjacent the ridged sections 82 and 88 respectively whereby as threads are rolled on one portion of the blank 25, the other blank portion thereof remains free of engagement with its adjacent die surface. This is important, as previously discussed, to enable the axis of the lubular blank portion to undulate relative to the opposed die surfaces as threads are rolled on such portion and subsequently to enable the threaded lobular blank portion to rotate free of engagement with the adjacent die surface as threads are rolled on the circular blank portion.

Figure 30:
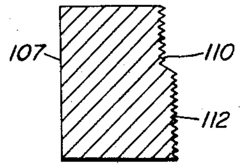
FIG. 30 is a left end view of the die of FIG. 28.
Figures 28, 29:
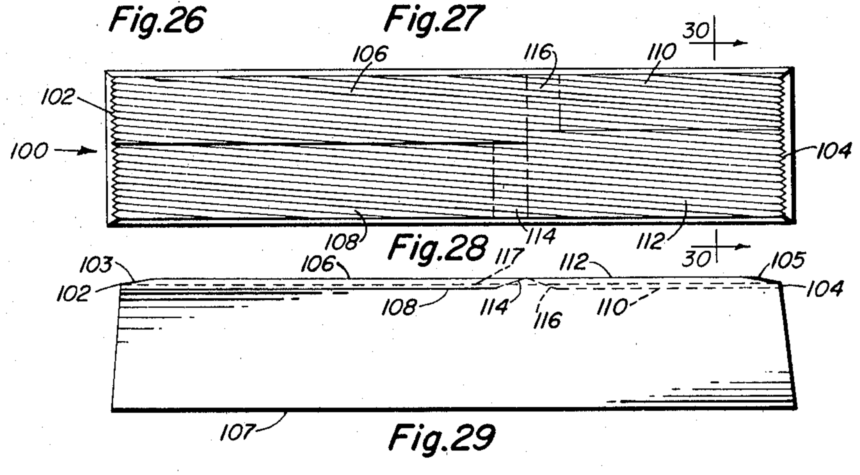
FIG. 28 is a top plan view of one of a pair of dies suitable for making the screw of FIG. 16.
FIG. 29 is a side view of the die of FIG. 28.

FIGS. 28 to 30 illustrate another die modification 100 somewhat similar to the die of FIG. 11, except that the die 100 is ridged throughout its blank-facing surface area. The die 100 is, of course, one of a pair and is especially intended for rolling threads on the blank 70 of FIG. 18 to produce the machine screw 64 of FIG. 16. Screw blanks are rolled relative to the ridged die surface shown in FIGS. 28 and 29 in the direction from the left-hand, or starting, end 102 having a short, inclined roll-on surface portion 103 to the right-hand, or finishing, end 104 having a declined roll-off surface portion 105. The ridged die surface is divided into four major quadrants, or sections, including a first section 106 extending from the starting end 102 at a relatively high, constant elevation above the base 107 of the die for forming threads on the straight, round shank portion 71 of the blank 70. A second section 108 laterally adjoins section 106 and is relieved with respect to the latter section to enable the lobular blank portion 72 to undulate between an opposed pair of matching die surfaces 108 without appreciable contact with either opposed surface as threads are rolled on the circular portion of the blank. The sections 106 and 108 are substantially coextensive and terminate in the mid-portion of the die at a sufficient distance from the starting end 102 to enable threads of a desired configuration to be formed on the circular portion of the screw blank.

A third, relieved section 110 extends longitudinally in continuation of section 106 to the finishing end 104. A fourth, raised surface section 112 of higher elevation than either of the two contiguous sections 108 and 110, extends from the section 108 to the finishing end 104. The raised section 112 rolls threads of lobular pitch surface cross section on the lobular work-entering end portion 72 of the blank 70 after threads have been rolled on the circular shank portion 71 of such blank and while the threaded shank portion 71 is free of engagement with the opposed die surface 110.

As is most apparent from FIG. 29, the relieved section 108 is joined to the higher surface section 112 by a short, inclined roll-on section 114. Similarly, the raised section 106 is joined to the relieved section 110 by a short, inclined roll-off section 116. The grooves of the raised sections 106 and 110 are represented by the dashed line 117, FIG. 29. Proceeding in a direction from the starting end 102 toward the finishing end 104, the roll-off section 116 commences in the same position, relative to the opposite ends of the die surface, at which the roll-off section 114 terminates, thereby providing a smooth transfer of blanks from the circular thread-rolling section 106 to the lobular thread-rolling section 112. It will also be noted that, similarly as in the comparable die section 88 of FIG. 24, the high section 112 is slightly greater in width than the longitudinally continguous relieved section 108, thereby overlapping the section 106 to provide on the lobular portion of a blank a smooth uninterrupted continuation of the thread previously formed on the circular shank portion of the same blank.

As clearly shown in FIG. 30, the die surface section 112 extends generally parallel to the base 107. There is no need for such surface to be transversely inclined as is the comparable surface 82 in the dies of FIGS. 11 and 24 because a taper is provided on the work-entering end 72 of the initial blank 70, resulting in a progressively unfinished tapered thread 80 being formed when the blank 70 is passed through a matching pair of the dies 100.

In view of the fact that the pitch diameters of the lobular portions of screws, such as those shown in FIGS. 3 and 20, are less than the pitch diameters of the round portions of such screws, it will be necessary, when using dies like that shown in FIGS. 28–30, to tilt one slightly with respect to the other, in the thread-rolling machine. The angle of inclination must be so adjusted that the spacing between the dies at the finish end of the lobular thread-rolling section corresponds to the reduced pitch diameter of the lobular thread portion.

Various modifications of the die 100 necessary to produce other thread forms and other screws having any desired ratio of circular to lobular threaded portions will be apparent to those skilled in the art.

The method in accordance with the present invention is broadly characterized by inserting a blank between a pair of opposed die surfaces, and while applying thread-forming pressures to the work-entering portion of such blank, causing the axis of the blank in such portion to undulate relative to the opposed die surfaces, thereby generating a thread formation on such portion having pitch surface cross sections of arcuate polygonal configuration. In the same dies, thread-rolling pressures are applied to a round shank portion of the blank axis in such shank portion and the opposed die surfaces, thereby generating on said shank portion a continuation of the thread on said work-entering end portion, having circular pitch surface cross sections. While the invention has been described with reference to screws having enlarged heads, it is to be understood that it is equally applicable to headless threaded devices such as studs, inserts, set screws and the like.

It is to be understood that while the present invention has been described with particular reference to certain illustrated embodiments, it is intended that the invention is not to be necessarily so limited. It is intended to claim as the present invention all variations and modifications as fall within the true spirit and scope of the following claims.

I claim:

1. A thread-forming fastener device having a continuous rolled thread formation on both shank and work-entering portions and with the pitch surface cross sections being of different configuration on said two portions, (a) the crest of the thread on said work-entering portion defining a lobular conical surface of non-circular cross-section tapering inwardly toward the work-entering end, (b) the thread formation on said work-entering end having pitch surface cross sections in the form of a generally arcuate triangle, each of such cross sections being of substantially uniform width throughout 360 degrees, (c) said triangle including symmetrically arranged arcuate sides merging gradually with intermediate arcuate lobes forming the apices of the triangle, (d) the radius of curvature of said sides of said triangle in each transverse cross section being greater than one-half of, but not greater than the width of, such cross section, (e) the radius of curvature of said lobes of said triangle in each transverse cross section being substantially less than one-half of the width of such cross section, (f) said shank portion being provided with a plurality of thread turns having a pitch surface which in cross section is of circular configuration, (g) the maximum width of the pitch surface cross sections on said work-entering end portion being less than the diameter of the pitch surface of said thread turns on said shank portion but increasing in width to an amount equal to said pitch diameter where it merges with the first of said plurality of thread turns on said shank portion.

2. A thread forming fastener device according to claim 1 but which includes a first shank portion between the work-entering end portion and the plurality of thread turns of circular pitch surface configuration, said first shank portion being provided with a plurality of thread turns having the same cross sectional pitch surface configuration as that of the thread turns on said work-entering end portion.

References Cited by the Examiner

UNITED STATES PATENTS

| | | | |
|---|---|---|---|
| 66,766 | 7/1867 | Young | 85—47 |
| 2,352,982 | 7/1944 | Tomalis | 85—41 |

FOREIGN PATENTS

| | | |
|---|---|---|
| 223,231 | 6/1956 | Japan. |

CARL W. TOMLIN, *Primary Examiner.*

EDWARD C. ALLEN, *Examiner.*